US007656669B2

(12) United States Patent
Lee et al.

(10) Patent No.: US 7,656,669 B2
(45) Date of Patent: Feb. 2, 2010

(54) SCALABLE COMPUTER SYSTEM AND RECONFIGURABLE CHASSIS MODULE THEREOF

(75) Inventors: Mario J. D. Lee, Fremont, CA (US);
Tomonori Hirai, Fremont, CA (US);
Jyh Ming Jong, Fremont, CA (US)

(73) Assignee: Mitac International Corp., Taoyuan (TW)

( * ) Notice: Subject to any disclaimer, the term of this patent is extended or adjusted under 35 U.S.C. 154(b) by 621 days.

(21) Appl. No.: 11/554,375

(22) Filed: Oct. 30, 2006

(65) Prior Publication Data

US 2008/0043427 A1 Feb. 21, 2008

Related U.S. Application Data

(60) Provisional application No. 60/822,411, filed on Aug. 15, 2006.

(51) Int. Cl.
*H05K 7/14* (2006.01)
(52) U.S. Cl. .................. 361/732; 361/729; 361/733; 361/796; 361/679.02; 211/26; 211/41.17
(58) Field of Classification Search .......... 361/726, 361/729, 730, 731, 732, 733, 735, 679.02, 361/796, 797; 211/26, 41.17
See application file for complete search history.

(56) References Cited

U.S. PATENT DOCUMENTS

| 4,597,291 | A | * | 7/1986 | Motomiya | 73/431 |
|---|---|---|---|---|---|
| 5,677,830 | A | * | 10/1997 | Nogas et al. | 361/790 |
| 5,818,696 | A | * | 10/1998 | Knoop | 361/730 |
| 6,172,874 | B1 | * | 1/2001 | Bartilson | 361/719 |
| 6,220,456 | B1 | * | 4/2001 | Jensen et al. | 211/26 |
| 6,498,735 | B2 | * | 12/2002 | Hosotani et al. | 363/21.15 |
| 6,643,141 | B2 | * | 11/2003 | Kaetsu et al. | 361/797 |
| 6,839,238 | B2 | * | 1/2005 | Derr et al. | 361/735 |
| 6,870,740 | B2 | * | 3/2005 | Hsu et al. | 361/732 |
| 7,499,282 | B1 | * | 3/2009 | Loucks | 361/730 |
| 7,505,280 | B1 | * | 3/2009 | Loucks | 361/752 |

\* cited by examiner

*Primary Examiner*—Dameon E Levi
(74) *Attorney, Agent, or Firm*—Quintero Law Office (57) ABSTRACT

A scalable computer system includes a reconfigurable chassis module, plural hardware units and one or more inter-plane. The chassis module has plural modular units for configuring the hardware units therein respectively. Each of the modular units has dedicated framework to attach the inter-plane or dedicated fans. The inter-plane is to connect with the separated hardware units between the modular units. Each of the modular units is equipped with compatible male and female joints to engage with each other. Certain fastening assemblies may be applied to secure male-male or female-female joints, thereby enabling the modular units to be front-to-back and/or side-by-side connections.

19 Claims, 7 Drawing Sheets

SCALABLE COMPUTER SYSTEM AND RECONFIGURABLE CHASSIS MODULE THEREOF

BACKGROUND OF THE INVENTION

1. Field of Invention

The present invention relates to the enclosure design of an electronic apparatus, and more particularly to a scalable computer system equipped with a reconfigurable chassis module.

2. Related Art

Traditional electronic enclosure design requires a fixed and predefined overall support chassis that provides the mechanical support for the internal electronic components. This limitation prevents some configurable options to be part of the base design dictated by the overall dimensions of the chassis and its internal structure. Generally, any system that does not require the full configurable options has unnecessary weight, empty unutilized space and cost associated with the system mechanical design. As future technology improvement become available, the mechanical design may not be able to accommodate the new form factors and may require a redesigned new chassis to support the feature, which would require extra cost. For example, new CPU and memory upgrades have to be supported with new power supplies or new interface sockets for higher power density and faster access speed requirements. Then extra cost comes after because the overall form factor of the chassis is fixed.

Furthermore, the traditional chassis design involves structural pieces of the chassis assembled within a sheet metal shell which prevent chassis level modularization. The traditional design also makes service of internal parts very difficult to reach and take longer time to complete.

SUMMARY OF THE INVENTION

To solve the problems existing in the prior art, the present invention provides a reconfigurable chassis module for a scalable computer system. The chassis module has plural modular units for configuring hardware units therein and is equipped with compatible male and female joints to engage with each other. Front-to-back and/or side-by-side connections of the modular units may be thus achieved to scale the computer system.

According to an embodiment of the present invention, a scalable computer system includes a chassis module, plural hardware units and an inter-plane.

The chassis module includes a first modular unit and a second modular unit. The first modular unit includes a first cage body, a first male joint and a first female joint. The first cage body includes two opposite open sides for the first male and female joints to be configured thereon respectively. And the second modular unit includes a second cage body, a second male joint and a second female joint. The second cage body includes another two opposite open sides for the second male and female joints to be configured thereon respectively. The hardware units are configured in the first modular unit or the second modular unit. The inter-plane includes plural sockets for connecting with the hardware units.

In an embodiment of the present invention, the second male joint is an L-shaped extension piece, while the first female joint is an S-shaped extension piece to form a slot compatible with the second male joint.

The advantage of the present invention about a modular electronic enclosure design provides a flexible chassis that accommodate changing depth, width and height requires including non-uniform cross sections in three dimensions that allow for better accommodation of the various electronic device form factors to maximize space utility, reduce weight and cost. This ability also allows various electronic boards or modules to be designed once and use everywhere, thus reducing the development cost and speed up time to market. This flexible modular approach allows different combinations of features and components to form a system very quickly to satisfy customer needs. A large and complex system can easily be scaled up using this basic modular chassis approach with minimal development time and capital tooling cost and also will protect customer investment as individual components can be reused as the system is upgraded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Please refer to FIGS. 1, 2, 3 and 3A. A computer system according to the present invention includes essential hardware units, such as mother board(s) 30, insert board(s) 40, power supply module(s) 50, fans 61, 62, 63, and inter-plane(s) 70, configured separately in a first modular unit 10 and a second modular unit 20 of a chassis module.

Figure 1:
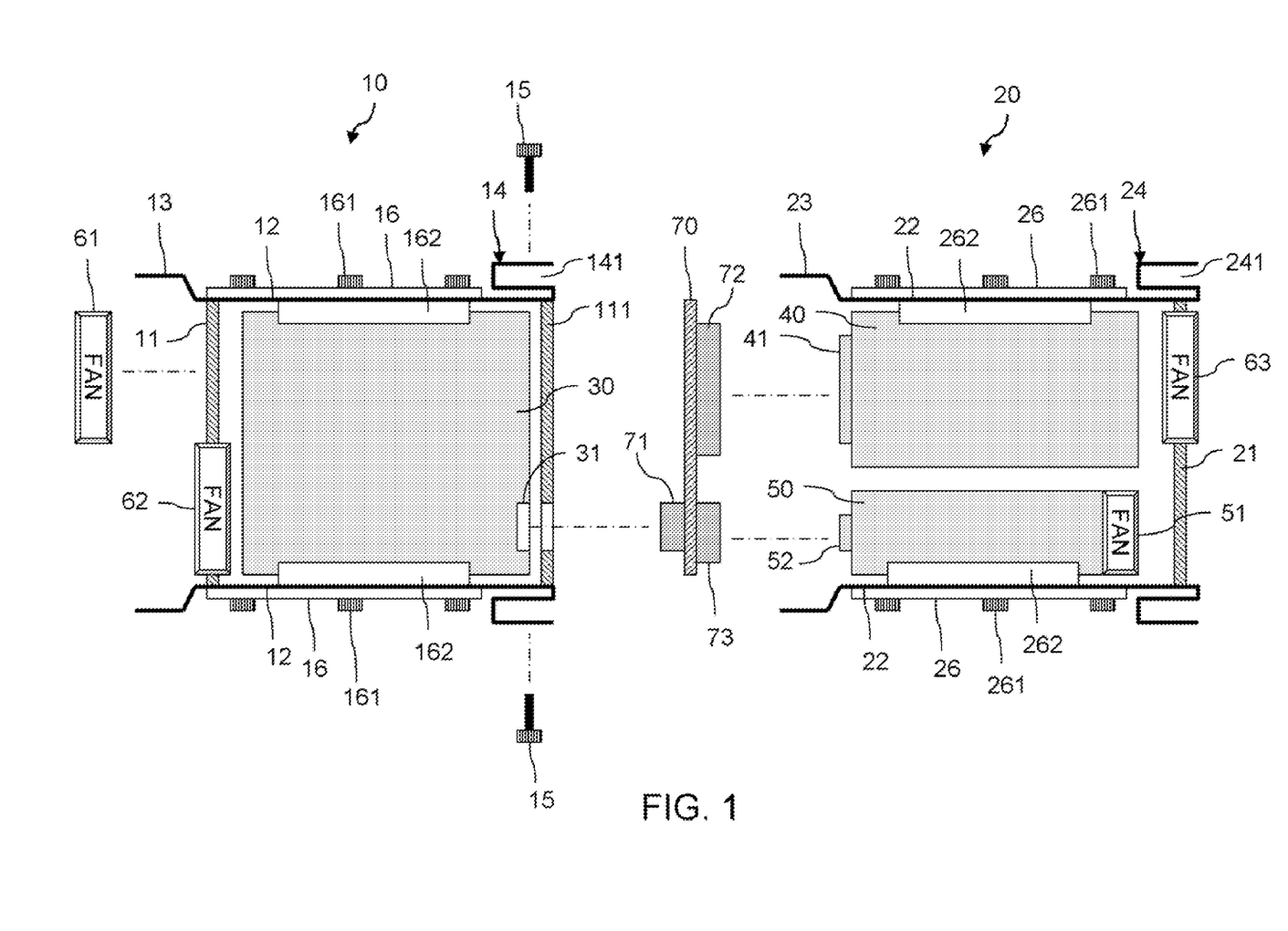
FIG. 1 is an explanatory diagram for a scalable computer system according to an embodiment of the present invention, illustrating separated first and second modular units and an inter-plane.

The mother board(s) 30 is a printed circuit board configured with various electrical components such as CPU(s), system memory, bridge chip(s), I/O controllers, network interface controller(s), and I/O connectors . . . etc., which are connected by specific buses to performance data processing tasks under an operation system. The insert board(s) 40 is to provide additional functions or capabilities to the computer system, which may have different interfaces in various operative practices. In the computer system according to the present invention, graphic card, network card, sever management daughter card or even CPU card may be one of the embodiments for the insert board 40. In some specific cases, another mother board may be applied as the insert board 40.

The power supply module(s) 50 supplies DC electricity to the mother board(s) 30 and also provides power directly or indirectly to the insert board(s) 40. Generally, one or more build-in fan(s) 51 and accompanying airflow channel is configured in the power supply module(s) 50.

The fans 61, 62, 63 are located at the front side (left in the drawings) or rear side of the first modular unit 10 or the second modular unit 20. Frameworks 11, 111, 21 could be helpful to the configuration of the fans 61, 62, 63 or other hardware units. The fans 61, 62, 63 are mainly controlled by the mother board(s) 30. A certain module, which is so-called "fan switches", includes control circuits and fan connectors (or pin headers) may be configured on the mother board(s) 30 or on the inter-plane (s) 70.

Figure 2:
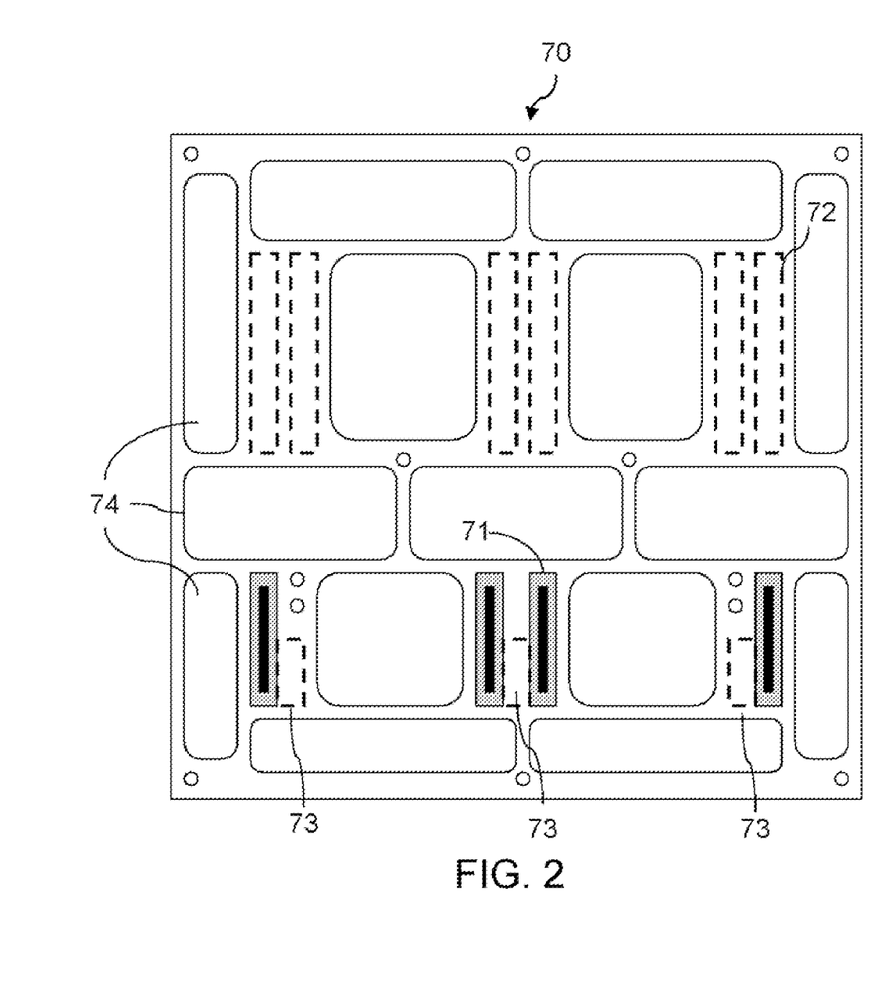
FIG. 2 is an explanatory diagram for the inter-plane in FIG. 1.
Figure 3:
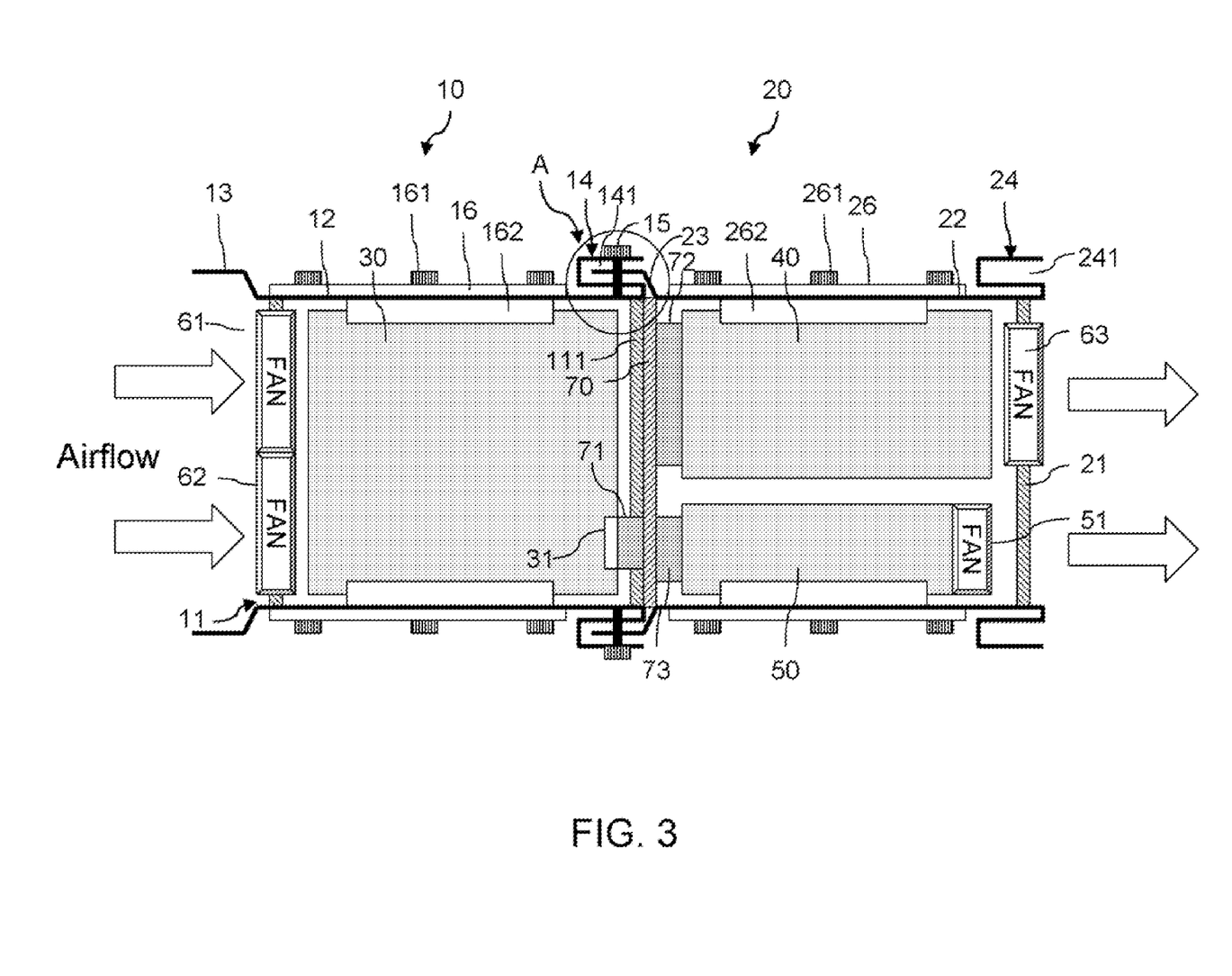
FIG. 3 is an explanatory diagram for the scalable computer system in FIG. 1, illustrating a front-to-back combination approach.
Figure 3A:
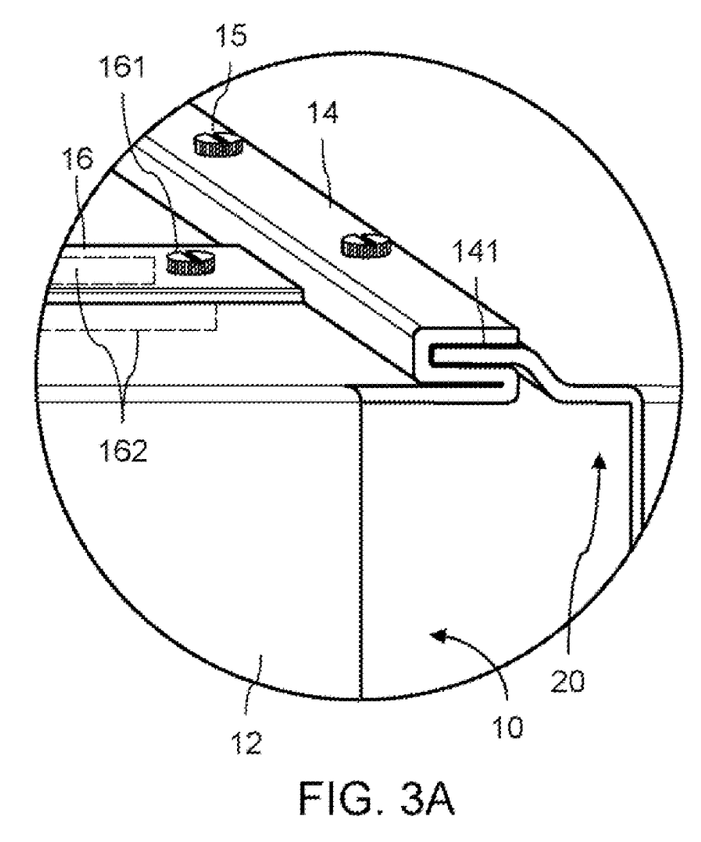
FIG. 3A is a partially-enlarged explanatory diagram for portion A in FIG. 3, illustrating the male-female joints combination of the first and second modular units.

Please refer to FIG. 2, and FIGS. 1 and 3 as well. The inter-plane(s) 70, fastened on the framework 111 (or directly fastened on the first modular unit 10), is utilized to connect the hardware units separately located in the first modular unit 10 and the second modular unit 20. In FIG. 2, four main sockets 71 are configured on the inter-plane 70 for connecting with the corresponsive main interface(s) 31 on the mother board(s) 30. Similarly, six expansion sockets 72 are for connecting expansion interface(s) 41 of the insert board(s) 40, while three power connectors 73 are configured on the inter-plane(s) 70 to connect power interface(s) 52 of the power supply module(s) 50. To allow the airflow passing through the inter-plane(s) 70, plural air holes 74 are located all over the inter-plane(s) 70 as possible. (So does the framework 11/111/21.) Since the remained spaces on the inter-plane(s) 70 seem not enough for single-layer lay-out, multi-layer PCB technology should be applied to the inter-plane(s) 70. Then circuit connections between the main sockets 71, the expansion sockets 72 and the power connectors 73 may be thus achieved. Except said sockets and connectors, a power distribution circuit, which is generally located on a power distribution board in the prior art, may be configured on the inter-plane(s) 70.

In FIGS. 1, 2 and 3, the first and second modular units 10, 20 are applied to a front-to-back connection. The two units 10, 20 have very similar mechanical architecture (the same in some cases), including rectangular first/second cage body 12/22, first/second male joint(s) 13/23 configured at the front bottom edges of the first/second modular unit 10/20, and first/second female joint(s) 14/24 at the rear edges. The first/second cage body 12/22 is a rectangular, tubular container with two opposite open sides to allow the hardware units of the computer system configuring or removing through its front and rear sides. The first/second male joint(s) 13/23 is an L-shaped extension piece at the open side(s) of the first/second cage body 12/22. The first/second female joint(s) 14/24 is an S-shaped extension piece at the opposite open side(s) to side(s) to form a slot 141/241 compatible with the first/second male joint(s) 13/23. Basically, the male and female joints are configured at the opposite open sides of the modular unit. The slot 141 of female joint(s) 14 is for receiving the end of the male joint(s) 23, while the slot 241 is possible to engage with the male joint 13 (replace exchange) or other male joints, if necessary. One or more fastener 15, such as a screw of any possible types, is used to fasten the engaged male/female joints 14/23. Corresponsive screw holes (not shown) on the male/female joints 14/23 will be necessary for a screw fastener. Furthermore, one or more modular unit may be coupled to the front side of the first modular unit 10 or the rear side of the second modular unit 20 to expand the computer system. And another inter-plane(s) will be the connection hub for the additional hardware units.

To provide structural support from the outsides of the first/second modular units 10/20, some stiffeners 16/26 are configured outside the first/second cage body 12/22 and fastened tightly by plural fasteners 161/261. The stiffeners 16/26 may be bar-shaped with screw holes or any other structures corresponding to the fasteners 161/261. Two guide pieces 162/262 extending from the stiffener 161/261 and inserting inside the first/second cage body 12/22 may be utilized as rails or tracks for the mother board(s) 30 (or insert boards 40) to slide inwards/outwards. A board tray (not shown) may be coupled to the mother board 30 (or insert board 40) first. In such case the board tray will be able to slide in and out along the guide pieces 162/262. Certainly, the guide pieces 162/262 may be utilized to guide or fasten the other hardware units, such as the insert boards 40 and the power supply units 50.

Figure 4:
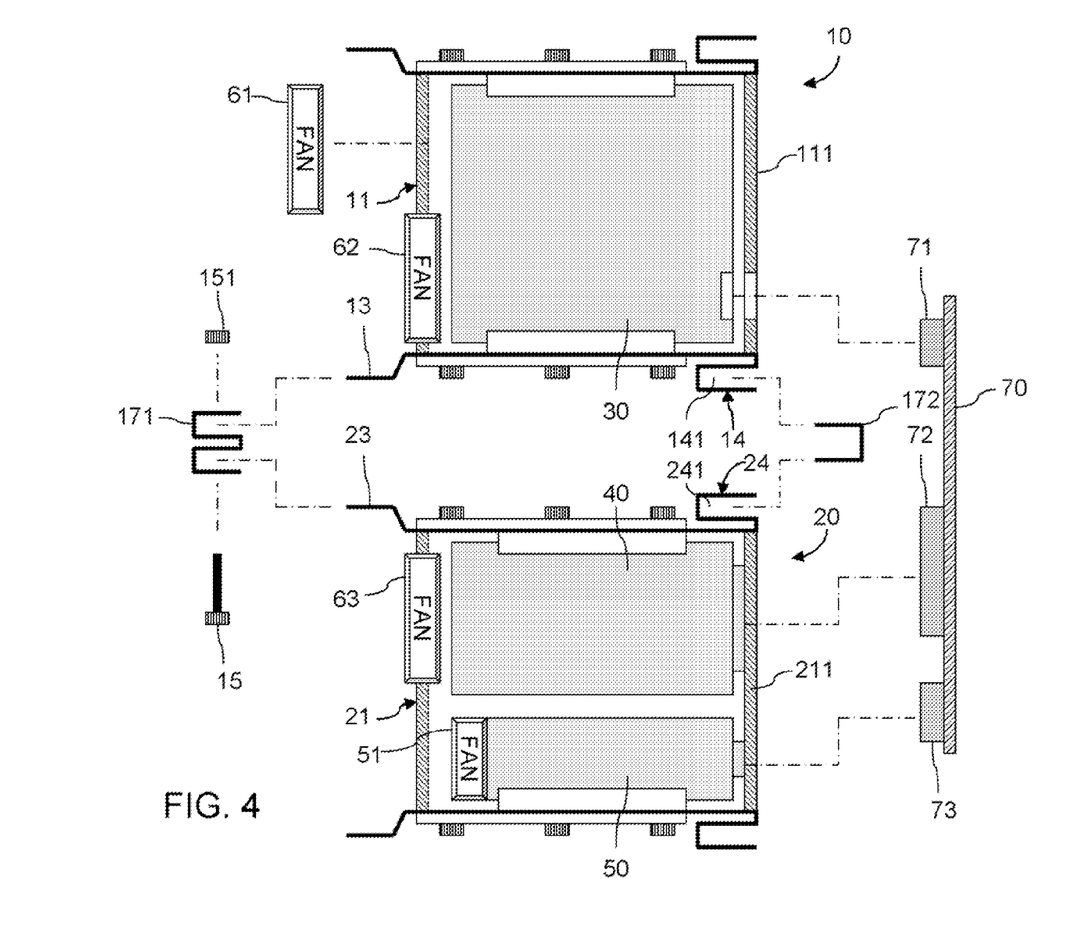
FIG. 4 is an explanatory diagram for a computer system according to another embodiment of the present invention, illustrating separated first and second modular units, an inter-plane, and a holder and a clamp for strengthen the combination.
Figure 5:
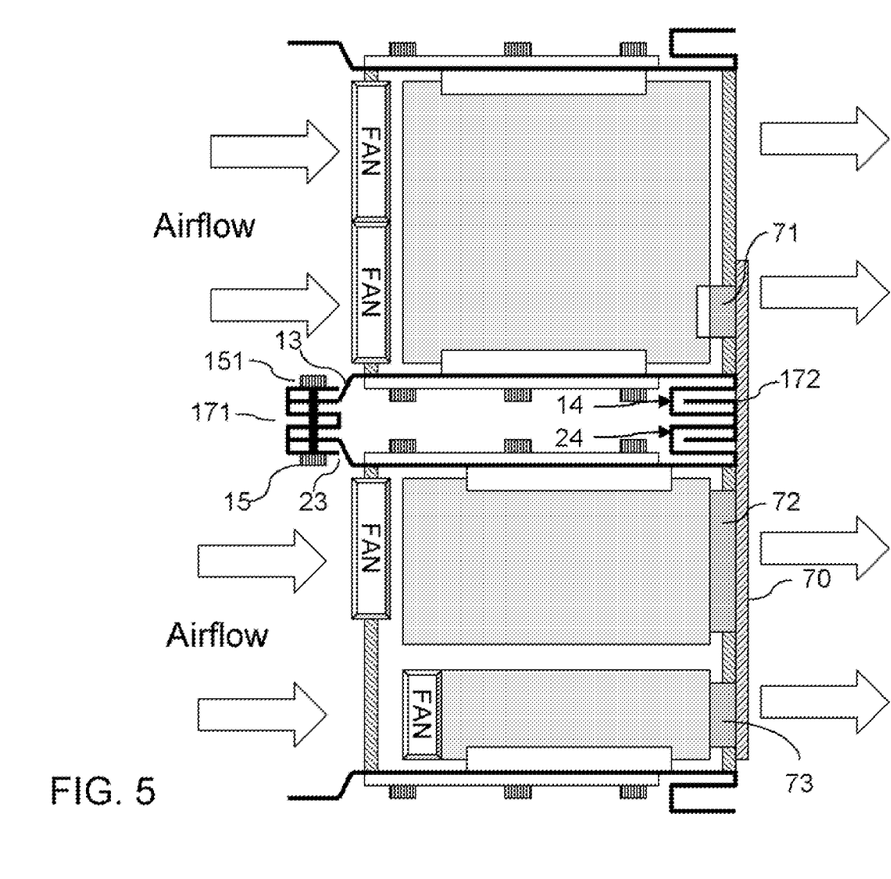
FIG. 5 is an explanatory diagram for the scalable computer system in FIG. 4, illustrating a side-by-side combination approach.

Please refer to FIGS. 4 and 5. The first and second modular units 10, 20 in the former embodiment may be applied to a side-by-side connection. The major differences between the present embodiment and the former one are as follows.

First of all, the first and second modular units 10, 20 are aligned adjacent to each other, which are coupled to each other in lateral or up-down position with the first male joint 13 and the second male joint 23 aligned closely, and with the first female joint 14 and the second female joint 24 attached together. A plate is bended to form a holder 171 with W-shaped cross-section, which receives the first and second male joint 13, 14. Then a fastener 15 and a nut 151, or any other fastening means in the prior art may be used to secure the first and second male joint 13, 14 solidly. In the other hand a U-shaped clamp 172 will be inserted into the slot 141, 241 of the first and second female joints 14, 24 to engage therein. The clamp 172 may be applied with latch/screw/dowel members or other means in the prior art to engage the first and second female joints 14, 24. In addition, the clamp 172 may be fixed on the inter-plane 70 in advance.

Moreover, in aforesaid embodiment the socket(s) 71/72 and connector(s) 73 are located on both sides of the inter-plane 70, while in the present embodiment all the main socket(s) 71, the expansion socket(s) 72 and power connector(s) 73 are located on the same side. And the size of the inter-plane is needed to be larger to extend to the other modular unit and reach all the sockets and connectors. Namely, the inter-plane 70 is configured at the adjacent two open sides of the first and second modular units 10, 20. Since the inter-plane 70 covers both modular units 10, 20, the framework 111 and 211 should be equipped for attaching the inter-plane 70.

Figure 6:
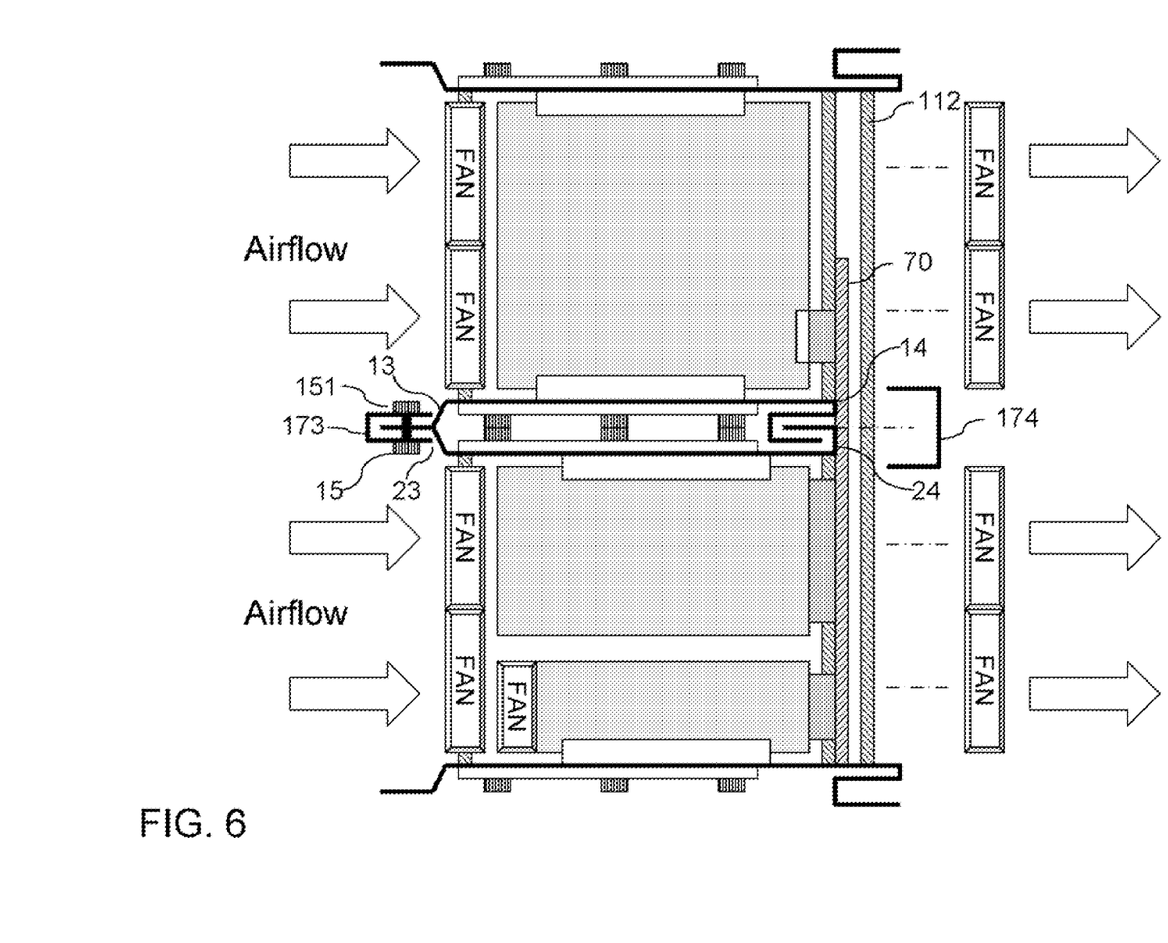
FIG. 6 is an explanatory diagram for a computer system according to another embodiment of the present invention.

Please refer to FIG. 6. To achieve better structural arrangement, the female joints 14, 24 or the first and second modular units 10, 20 may not be perfectly symmetrical. The second female joint 24 in FIG. 6 is a U-shaped piece that has an end to insert into the first female joint 14. This allows the second female joint 24 directly engages with the first female joint 14. Another U-shaped keeper 174 may be used to clamp both the first and second female joints 14, 24. The keeper 174 may also be configured on the inter-plane 70 in advance. Furthermore, the U-shaped second female joint 24 allows the first and second male joints 13, 23 to lean closer to each other. And another U-shaped clasp 173 may be utilized to engage with both the first and second male joints 13, 23.

In FIG. 6 the adjacent sides of the first and second modular units 10, 20 are shorter than the other sides. That allows a full framework 112 to be configured at the rear sides (the adjacent open sides) of both the first and second modular units 10, 20, which provides more structural support for the combined modular units. Meanwhile, additional fans may be thus attached to the full framework 112 and meet the scalable cooling requirements.

The embodiments described above according to the present invention discloses novel concepts, including outside-in chassis design approach, modular mechanical interface and modular cooling.

The present invention provides all mechanical support structural pieces (the stiffener with the fasteners) to be modular, accessible and assembled from the outside of a basic enclosure space (the first/second modular unit), which is defined as an outside-in approach. The traditional chassis design involves structural pieces of the chassis assembled within a sheet metal shell which prevent chassis level modularization. Also, the traditional design makes service of internal parts very difficult to reach and take longer time to complete. In the present invention, the basic modular units would form the boundary where all electronic components are held on the inside without any internal structural pieces. All structural pieces are attached and removable from the outside. This approach will allow for easy access to internal parts and reduce service cycle time.

Meanwhile, each of the modular units are provided with a standardized interface (male/female joint with fastener/holder/clamp) that allows any chassis module to mate and meet mechanical strength and also EMI requirements can possibly be fulfilled. The present invention discloses standardized male and female joints and (standardized) removable and serviceable structural fasteners, thereby allowing the computer system to be scalable. Then the universal built-in structural reinforcement at the joints will easily to be developed.

Although the embodiments disclosed above are for 1-by-1 combinations, the computer system according to the present invention may possibly include 4 (2-by-2), 9 (3-by-3) or more modular units. Both the side-by-side connection and the front-to-back connection may be applied to an integrated, single chassis module.

For the requirements of a scalable computer system and its reconfigurable chassis module, each individual modular units of the chassis module should mechanically supports its own electronic components, including a cooling unit, i.e. a fan. For some practical embodiments, each cooling unit may be provided with the electrical power from and report sensor functions back to the modular unit it attached to, and then receive unit level or system level management commands from the same or the other modular unit. That means each modular cooling unit is part of the modular unit and scales with the individual modular unit. It provides adequate cooling to the local modular electronic components. In the above-mentioned embodiments, each modular cooling unit conforms to the over system cooling scheme (front to back) through the air holes on the inter-plane(s) or the frameworks. Furthermore, the assembly of each individual modular cooling unit into the system is reinforcing each other and provides redundant cooling to each other unit in the computer system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chassis module for a scalable computer system equipped with a plurality of hardware units, comprising:

at least one first modular unit including a first cage body, at least one first male joint and at least one first female joint, the first cage body including two opposite open sides for the first male and female joints to be configured thereon respectively; and at least one second modular unit including a second cage body, a least one second male joint and at least one second female joint, the second cage body including another two opposite open sides for the second male and female joints to be configured thereon respectively;

wherein the second male joint is an L-shaped extension piece, the first female joint is an S-shaped extension piece to form a slot compatible with the second male joint, and wherein each of the first and second modular units comprises at least one stiffener configured outside the first/second cage body.

2. The chassis module of claim 1, wherein the slot of the first female joint engages with the second male joint to achieve a front-to-back connection.

3. The chassis module of claim 2 further comprising at least one fastener to fasten the engaged first female joint and the second male joint.

4. The chassis module of claim 1, wherein each of the first and second modular units comprises at least one framework with a plurality of air holes.

5. The chassis module of claim 1, wherein the stiffener comprises at least one guide piece inserting inside the first/second cage body.

6. A chassis module for a scalable computer system equipped with a plurality of hardware units, comprising:

at least one first modular unit including a first cage body, at least one first male joint and at least one first female joint, the first cage body including two opposite open sides for the first male and female joints to be configured thereon respectively;

at least one second modular unit including a second cage body, a least one second male joint and at least one second female joint, the second cage body including another two opposite open sides for the second male and female joints to be configured thereon respectively; and a W-shaped holder to engage with the first and second male joints;

wherein the second male joint is an L-shaped extension niece, the first female joint is an S-shaped extension niece to form a slot compatible with the second male joint, and wherein the first and second modular units are aligned adjacent to each other with the first and second male joints aligned closely to achieve a side-by-side connection.

7. The chassis module of claim 6, wherein the second female joint is another extension piece with an S-shaped bend to form a slot compatible with the first male joint, the chassis module comprising a U-shaped clamp inserting into the slots of the first and second female joints for engaging therein.

8. The chassis module of claim 6, wherein the second female joint is a U-shaped piece that has an end to insert into the first female joint.

9. The chassis module of claim 8 further comprising a U-shaped clasp to engage with both the first and second male joints.

10. The chassis module of claim 8 further comprising a U-shaped keeper to clamp both the first and second female joints.

11. The chassis module of claim 6, wherein the adjacent sides of the first and second modular units are shorter than the other sides.

12. The chassis module of claim 11 further comprising a full framework configured at both the adjacent open sides of the first and second modular units.

13. A scalable computer system, comprising:
- a chassis module including at least one first modular unit and at least one second modular unit, the first modular unit including a first cage body, a least one first male joint and at least one first female joint, the first cage body including two opposite open sides for the first male and female joints to be configured thereon respectively, and the second modular unit including a second cage body, a least one second male joint and at least one second female joint, the second cage body including another two opposite open sides for the second male and female joints to be configured thereon respectively;
- a plurality of hardware units configured in the first modular unit or the second modular unit; and
- at least one inter-plane including a plurality of sockets for connecting with the hardware units;
- wherein the second male joint is an L-shaped extension piece, the first female joint is an S-shaped extension piece to form a slot compatible with the second male joint, and wherein each of the first and second modular units comprises at least one stiffener configured outside the first/second cage body and the stiffener comprises at least one guide niece inserting inside the first/second cage body for guiding or fastening the hardware units.

14. The computer system of claim 13, wherein the slot of the first female joint engages with the second male joint to achieve a front-to-back connection and the inter-plane is configured between the first and second modular units, the chassis module further comprising at least one fastener to fasten the engaged first female joint and the second male joint.

15. The computer system of claim 13, wherein each of the first and second modular units comprises at least one framework for configuring the inter-plane or at least one fan of the computer system.

16. The computer system of claim 13, wherein the first and second modular units are aligned adjacent to each other with the first and second male joints aligned closely to achieve a side-by-side connection, the inter-plane being configured at the two adjacent open sides of the first and second modular units.

17. The computer system of claim 16 further comprising a W-shaped holder to engage with the first and second male joints, the second female joint being another extension piece with an S-shaped bend to form a slot compatible with the first male joint, the chassis module comprising a U-shaped clamp inserting into the slots of the first and second female joints for engaging therein.

18. The computer system of claim 16, wherein the second female joint is a U-shaped piece that has an end to insert into the first female joint, the chassis module further comprising a U-shaped clasp to engage with both the first and second male joints, the chassis module further comprising a U-shaped keeper to clamp both the first and second female joints.

19. The computer system of claim 16, wherein the adjacent sides of the first and second modular units are shorter than the other sides, the chassis module further comprising a full framework configured at both the adjacent open sides of the first and second modular units.

* * * * *